(12) United States Patent
Goto et al.

(10) Patent No.: US 9,833,771 B2
(45) Date of Patent: Dec. 5, 2017

(54) EXHAUST GAS PURIFYING CATALYST

(71) Applicant: CATALER CORPORATION, Kakegawa-shi, Shizuoka (JP)

(72) Inventors: Takashi Goto, Kakegawa (JP); Kenichi Taki, Kakegawa (JP); Satoshi Matsueda, Kakegawa (JP)

(73) Assignee: CATALER CORPORATION, Kakegawa (JP)

( * ) Notice: Subject to any disclaimer, the term of this patent is extended or adjusted under 35 U.S.C. 154(b) by 0 days.

(21) Appl. No.: 15/037,078

(22) PCT Filed: Nov. 11, 2014

(86) PCT No.: PCT/JP2014/079878
§ 371 (c)(1),
(2) Date: May 17, 2016

(87) PCT Pub. No.: WO2015/079908
PCT Pub. Date: Jun. 4, 2015

(65) Prior Publication Data
US 2016/0288099 A1 Oct. 6, 2016

(30) Foreign Application Priority Data

Nov. 28, 2013 (JP) .................... 2013-246607

(51) Int. Cl.
*B01J 23/00* (2006.01)
*B01J 23/63* (2006.01)
(Continued)

(52) U.S. Cl.
CPC ............ *B01J 23/63* (2013.01); *B01D 53/945* (2013.01); *B01D 53/9454* (2013.01);
(Continued)

(58) Field of Classification Search
CPC ........ B01J 23/63; B01J 35/04; B01J 35/0006; B01J 23/10; B01D 53/945; B01D 2255/1021; B01D 2255/407
(Continued)

(56) References Cited

U.S. PATENT DOCUMENTS 6,875,408 B1 4/2005 Yamamoto et al.
2003/0061860 A1* 4/2003 Hu .................... B01D 53/9454
73/23.31
(Continued)

FOREIGN PATENT DOCUMENTS

EP 2075063 A1 7/2009
JP S6271540 A 4/1987
(Continued)

OTHER PUBLICATIONS

Jan. 13, 2015 International Search Report issued in International Patent Application No. PCT/JP2014/079878.
(Continued)

*Primary Examiner* — Haytham Soliman
(74) *Attorney, Agent, or Firm* — Oliff PLC

(57) ABSTRACT

The exhaust gas purifying catalyst presented here includes a substrate and a catalyst coat layer formed on the surface of the substrate. The catalyst coat layer is formed in a laminate structure having two layers, with a first layer being nearer to the surface of the substrate and a second layer being relatively further from this surface. The second layer includes a carrier and a noble metal supported on the carrier. The first layer is a noble metal-free layer that does not contain a noble metal but does contain an OSC material having oxygen storage capacity.

6 Claims, 5 Drawing Sheets

(51) Int. Cl.
  *B01J 37/02* (2006.01)
  *B01D 53/94* (2006.01)
  *B01J 23/10* (2006.01)
  *B01J 35/00* (2006.01)
  *B01J 35/04* (2006.01)
  *F01N 3/28* (2006.01)

(52) U.S. Cl.
  CPC ........... *B01J 23/10* (2013.01); *B01J 35/0006* (2013.01); *B01J 35/04* (2013.01); *B01J 37/0244* (2013.01); *B01D 2255/1021* (2013.01); *B01D 2255/1025* (2013.01); *B01D 2255/2092* (2013.01); *B01D 2255/407* (2013.01); *B01D 2255/65* (2013.01); *B01D 2255/908* (2013.01); *B01D 2255/9022* (2013.01); *B01D 2255/9202* (2013.01); *F01N 3/2803* (2013.01); *Y02T 10/22* (2013.01)

(58) Field of Classification Search
  USPC ........................................................ 502/325
  See application file for complete search history.

(56) References Cited

U.S. PATENT DOCUMENTS

| | | |
|---|---|---|
| 2004/0082468 A1 | 4/2004 | Suzawa et al. |
| 2005/0227867 A1 | 10/2005 | Chen et al. |
| 2005/0282701 A1 | 12/2005 | Foong et al. |
| 2008/0045404 A1 | 2/2008 | Han et al. |
| 2012/0021899 A1* | 1/2012 | Nobukawa ........... B01D 53/945 502/304 |

FOREIGN PATENT DOCUMENTS

| | | |
|---|---|---|
| JP | H02-198635 A | 8/1990 |
| JP | H06-262089 A | 9/1994 |
| JP | 2001-145836 A | 5/2001 |
| JP | 2003-200061 A | 7/2003 |
| JP | 2004-033933 A | 2/2004 |
| JP | 2004-154766 A | 6/2004 |
| JP | 2005-505403 A | 2/2005 |
| JP | 2008-503345 A | 2/2008 |
| JP | 2011-212639 A | 10/2011 |
| JP | 2012-024698 A | 2/2012 |

OTHER PUBLICATIONS

Jun. 9, 2016 International Preliminary Report on Patentability issued in International Patent Application No. PCT/JP2014/079878.

* cited by examiner

EXHAUST GAS PURIFYING CATALYST

TECHNICAL FIELD

The present invention relates to an exhaust gas purifying catalyst. More specifically, the present invention relates to an exhaust gas purifying catalyst provided with a substrate and a catalyst coat layer formed on the surface of the substrate.

Moreover, the present international application claims priority on the basis of Japanese Patent Application No. 2013-246607, which was filed on 28 Nov. 2013, and all the details of that application are incorporated by reference in the present description.

BACKGROUND ART

Three-way catalysts containing at least one noble metal selected from among Pt (platinum), Pd (palladium) and Rh (rhodium) are widely used to clean exhaust gases discharged from internal combustion engines such as automobile engines. In a typical constitution of such a three-way catalyst, a catalyst coat layer made of alumina is formed on the surface of a highly heat-resistant ceramic substrate, and one or two or more noble metals selected from among Pt, Pd and Rh are supported on the catalyst coat layer. Among these noble metals, Pd and Pt mainly contribute to carbon monoxide (CO) and hydrocarbon (HC) elimination performance, and Rh mainly contributes to NOx elimination performance (reductive elimination performance).

In order to efficiently eliminate components contained in exhaust gases using this type of three-way catalyst, it is preferable for the air/fuel ratio, which is the mixing ratio of air and gasoline supplied to the engine, to be close to the stoichiometric air-fuel ratio. In the past, OSC materials that were inorganic materials having oxygen storage capacity (OSC) were used as carriers for noble metals in order to alleviate fluctuations in air/fuel ratio atmospheres at which catalysts could operate effectively (for example, see PTL 1). An OSC material stores oxygen present in an exhaust gas when the air/fuel ratio of the exhaust gas is lean and converts the exhaust gas into a reducing atmosphere, thereby easily reducing NOx present in the exhaust gas. Meanwhile, when the air/fuel ratio of the exhaust gas becomes rich, oxygen stored by the OSC material is released and the exhaust gas is converted into an oxidizing atmosphere, thereby readily oxidizing CO and HC present in the exhaust gas. In this way, even if fluctuations occur in the oxygen concentration in the exhaust gas, stable catalytic performance can be achieved and the purifying performance of the catalyst is improved.

CITATION LIST

Patent Literature

[PTL 1] Japanese Patent Application Publication No. 2011-212639

SUMMARY OF INVENTION

According to findings by the inventors of the present invention, however, in cases where an exhaust gas purifying catalyst obtained by supporting a noble metal on an OSC material is used, the oxygen release rate of an OSC material becomes faster if the noble metal acts as an oxygen absorption and release intermediary. As a result, atmosphere buffering occurs rapidly when the atmosphere switches from lean to rich, the atmosphere inside the catalyst is slow to revert to a rich state, and when the atmosphere subsequently reverts to a lean state, it may not be possible to sufficiently eliminate NOx. That is, there are concerns that the desired NOx elimination performance may not be achieved.

With these circumstances in mind, the main objective of the present invention is to provide an exhaust gas purifying catalyst which is provided with an OSC material having oxygen storage capacity and which can exhibit high NOx elimination performance.

As a result of diligent research into how to solve the problems mentioned above, the inventors of the present invention found that using an OSC material which has oxygen storage capacity and on which a noble metal is not supported improves the NOx elimination performance of a catalyst and found that by disposing the OSC material and a noble metal in separate layers, it was possible to effectively improve the NOx elimination performance of the catalyst, and thereby completed the present invention.

That is, an exhaust gas purifying catalyst provided by the present invention is disposed in an exhaust passage of an internal combustion engine, eliminates NOx contained in exhaust gas, and includes a substrate and a catalyst coat layer formed on the surface of the substrate. The catalyst coat layer is formed in a laminate structure having at least two layers, with a first layer being nearer to the surface of the substrate and a second layer being relatively further from this surface. Among the first layer and the second layer, one of these layers includes a carrier and a noble metal supported on the carrier. The other of these layers is a noble metal-free layer that does not contain a noble metal but does contain an OSC material having oxygen storage capacity (that is, an OSC material on which a noble metal is not supported, also referred to as a noble metal-free OSC material).

According to this constitution, the noble metal-free OSC material contained in the noble metal-free layer does not support a noble metal, and a noble metal is not present in the vicinity of the noble metal-free OSC material. In this way, the oxygen storage rate of the OSC material contained in the noble metal-free layer is slower than with conventional products, meaning that the atmosphere inside the catalyst readily reverts to a rich state when the atmosphere switches from lean to rich, and NOx are not readily discharged when the atmosphere subsequently reverts to a lean state. As a result, higher NOx elimination performance can be achieved than in the past.

In a preferred aspect of the exhaust gas purifying catalyst disclosed here, the average thickness of the noble metal-free layer is 10 µm to 50 µm (and preferably 20 µm to 40 µm). If the average thickness of the noble metal-free layer is significantly less than 10 µm or significantly greater than 50 µm, the NOx elimination performance improvement effect achieved by providing the noble metal-free layer that contains the noble metal-free OSC material is not sufficiently exhibited, and high purifying performance may not be achieved.

In a preferred aspect of the exhaust gas purifying catalyst disclosed here, the noble metal-free layer further contains alumina (that is, alumina that does not support a noble metal). In addition, the blending ratio by mass of the OSC material and the alumina (OSC material/alumina) is between 1/3 and 4/1 (and preferably between 1/2 and 3/1). According to this constitution, because the mass ratio of the OSC material and the alumina achieves an appropriate balance, the effects achieved by using both the OSC material and the alumina (for example, high durability (and particularly heat resistance) exhibited by the alumina, and the oxygen storage and release capacity exhibited by the OSC material) can be suitably exhibited.

In a preferred aspect of the exhaust gas purifying catalyst disclosed here, the noble metal-free layer is the first layer, which is closer to the surface of the substrate, and the layer containing the noble metal is the second layer, which is relatively further from the surface of the substrate. In this way, by disposing the layer containing the noble metal as the second layer that is separated from the surface of the substrate (that is, the surface layer side of the catalyst coat layer), blow-through of exhaust gas on the layer containing the noble metal can be suppressed, meaning that the catalytic effect of the noble metal can be sufficiently exhibited and higher NOx elimination performance can be achieved.

In a preferred aspect of the exhaust gas purifying catalyst disclosed here, the noble metal-free layer includes a ceria-zirconia complex oxide as the OSC material. Ceria-zirconia complex oxides exhibit high oxygen storage and release capacity, and can therefore be advantageously used as OSC materials that are suitable for the objective of the present invention. Of these, the use of a ceria-zirconia complex oxide having a pyrochlore type structure is preferred. Ceria-zirconia complex oxides having pyrochlore type structures exhibit slower oxygen storage rates than ceria-zirconia complex oxides having other crystalline structures (for example, fluorite type structures), and can therefore better exhibit the effects mentioned above.

In a preferred aspect of the exhaust gas purifying catalyst disclosed here, the layer containing the noble metal includes alumina as the carrier. Alternatively, the layer containing the noble metal may include an OSC material having oxygen storage capacity as the carrier. According to this constitution, it is possible to further increase the oxygen storage and release capacity of the overall catalyst.

DESCRIPTION OF EMBODIMENTS

Based on the drawings, explanations will now be given of preferred embodiments of the present invention. Moreover, matters which are essential for carrying out the invention (for example, ordinary matters such as those relating to the arrangement of the exhaust gas purifying catalyst) and which are matters other than those explicitly mentioned in this specification (for example, the composition of the porous carrier, and the like) are matters that a person skilled in the art could understand to be matters of design on the basis of the prior art in this technical field. The present invention can be carried out on the basis of the matters disclosed in the present specification and common general technical knowledge in this technical field. Moreover, in the explanations given below, an exhaust gas in which the air/fuel ratio is lean, stoichiometric or rich means an exhaust gas having an air/fuel ratio that is similar to the air/fuel ratio in the exhaust gas discharged from an internal combustion engine when lean, stoichiometric and rich gas mixtures are combusted in the internal combustion engine, or an exhaust gas in which hydrocarbons are subsequently supplied to this exhaust gas.

The exhaust gas purifying catalyst disclosed here is formed of a substrate and a catalyst coat layer formed on the surface of the substrate, and the catalyst coat layer is formed in a laminated structure.

Figure 1:
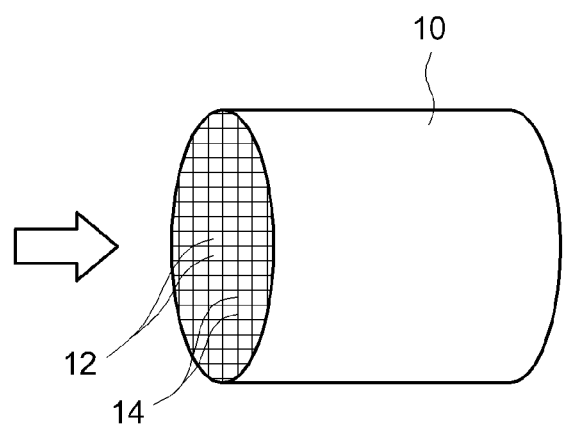
FIG. 1 is a perspective view that illustrates an exhaust gas purifying catalyst according to one embodiment of the present invention.

FIG. 1 is a schematic diagram showing a typical example of an exhaust gas purifying catalyst. The exhaust gas purifying catalyst 100 according to the present embodiment includes a honeycomb substrate 10 having a plurality of regularly arranged cells 12 and rib walls 14 that constitute these cells 12.

The substrate 10 that constitutes the exhaust gas purifying catalyst 100 disclosed here can use a variety of materials and forms that were used in the past in this type of application. For example, a honeycomb substrate having a honeycomb structure formed from a ceramic such as cordierite or silicon carbide (SiC) or an alloy (stainless steel or the like) can be advantageously used. One example is a honeycomb substrate having a cylindrical shape, wherein through holes (cells) are provided as exhaust gas passages in the cylinder axial direction of the honeycomb substrate and an exhaust gas can come into contact with dividing walls (rib walls) that divide the cells. In addition to a honeycomb form, the form of the substrate can be foam-like, pellet-like, or the like. In addition, the external shape of the substrate as a whole can be an elliptic cylinder or a polygonal cylinder instead of a circular cylinder.

<Catalyst Coat Layer>

Figure 2:
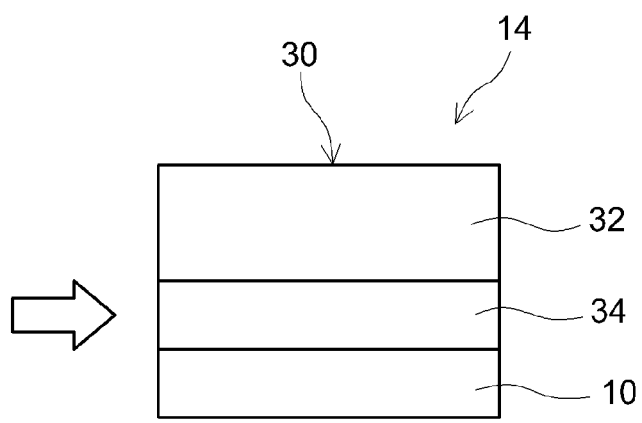
FIG. 2 is a diagram that schematically illustrates a rib wall part in an exhaust gas purifying catalyst according to one embodiment of the present invention.

FIG. 2 is a diagram that schematically illustrates the constitution of a rib wall 14 in the honeycomb substrate 10 shown in FIG. 1. The rib wall 14 includes the substrate 10 and a catalyst coat layer 30 having a two layer structure, which is formed on the surface of the substrate. The catalyst coat layer 30 having a two layer structure is formed in a laminate structure having at least two layers, with the first layer 34 being nearer to the surface of the substrate 10 and the second layer 32 being relatively further from this surface. Hereinafter, for the sake of convenience, the first layer 34 will be referred to as the lower layer and the second layer 32 will be referred to as the upper layer. In the feature disclosed here, the upper layer 32 of the catalyst coat layer 30 includes a carrier and a noble metal supported on the carrier. Meanwhile, the lower layer 34 of the catalyst coat layer 30 is a noble metal-free layer that does not contain a noble metal and contains an OSC material having oxygen storage capacity.

<Lower Layer (First Layer)>

The lower layer (first layer) 34 that constitutes the catalyst coat layer 30 disclosed here is a noble metal-free layer 34 that does not contain a noble metal and contains an OSC material having oxygen storage capacity. In other words, the OSC material contained in the noble metal-free layer 34 does not support a noble metal, and no noble metal is present in the vicinity of the noble metal-free OSC material. This noble metal-free OSC material has the function of storing oxygen present in an exhaust gas when the air/fuel ratio in the exhaust gas is lean (that is, an atmosphere on the oxygen-excess side) and releasing stored oxygen when the air/fuel ratio in the exhaust gas is rich (that is, an atmosphere on the fuel-excess side). In addition, the noble metal-free OSC material does not support a noble metal and no noble metal is present in the vicinity of the OSC material, meaning that the oxygen release rate is slower than a conventional OSC material that supports a noble metal. In this way, the atmosphere inside the catalyst readily reverts to a rich state when the atmosphere switches from lean to rich, and NOx are readily eliminated when the atmosphere subsequently reverts to a lean state. As a result, higher NOx elimination performance can be achieved than in the past.

Examples of the noble metal-free OSC material include cerium oxide (ceria: $CeO_2$) and ceria-containing complex oxides (for example, ceria-zirconia complex oxides ($CeO_2$—$ZrO_2$ complex oxides)). Of these OSC materials, the use of $CeO_2$—$ZrO_2$ complex oxides is preferred. By forming a solid solution of $ZrO_2$ in $CeO_2$, $CeO_2$ grain growth is suppressed and it is possible to suppress a deterioration in OSC performance after use over a long period of time. The blending ratio of $CeO_2$ and $ZrO_2$ in the $CeO_2$—$ZrO_2$ complex oxide is such that $CeO_2/ZrO_2$ ratio is 0.25 to 0.75 (preferably 0.3 to 0.6, and more preferably approximately 0.5). By setting the $CeO_2/ZrO_2$ ratio to fall within the range mentioned above, high OSC (oxygen storage capacity) can be achieved.

The $CeO_2$—$ZrO_2$ complex oxide may also contain other compounds (typically inorganic oxides) as secondary components. Rare earth elements such as lanthanum, alkaline earth elements such as calcium, and transition metals can be used as such compounds. Of these, rare earth elements such as lanthanum can be advantageously used as stabilizers in order to improve the specific surface area of the complex oxide at high temperatures without impairing the function of the catalyst. For example, rare earth oxides such as $La_2O_3$, $Y_2O_3$ and $Pr_6O_{11}$ can be incorporated in order to suppress sintering or the like. These rare earth oxides may be physically mixed as individual oxides in a carrier powder, but can also be one component of the complex oxide. The content (mass ratio) of these secondary components is preferably 2% to 30% (for example, 3% to 6%) of the overall carrier. If the content of secondary components is too low, effects such as suppressing sintering are insufficient, and if the content of secondary components is too high, the quantity of $ZrO_2$ or $CeO_2$ shows a relative decrease, which can cause a deterioration in heat resistance and OSC.

In addition, the noble metal-free OSC material may include an OSC material having a pyrochlore type structure. Here, a pyrochlore type structure is one represented by $A_2B_2O_7$ in cases where B denotes a transition metal element, is a type of crystalline structure formed of a combination of $A^{3+}/B^{4+}$ or $A^{2+}/B^{5+}$, and occurs when the ionic radius of A in this type of crystalline structure is relatively small. In cases where a CZ complex oxide is used as the OSC material, the chemical formula of the OSC material having a pyrochlore type structure is represented by $Ce_2Zr_2O_7$, and Ce atoms and Zr atoms sandwich oxygen atoms in a regular arrangement. This OSC material having a pyrochlore type structure exhibits a slower oxygen storage rate than OSC materials having other types of crystal structure (for example, a fluorite type structure), and can therefore better exhibit the effects mentioned above.

The lower layer (first layer) 34 disclosed here may contain materials other than the noble metal-free OSC material (non-OSC materials). Such non-OSC materials do not support a noble metal, and are preferably metal oxides having excellent heat resistance. For example, it is possible to use aluminum oxide (alumina: $Al_2O_3$), zirconium oxide (zirconia: $ZrO_2$), or the like. Of these, the use of alumina is preferred. Alumina exhibits higher durability (and especially heat resistance) than $CeO_2$—$ZrO_2$ complex oxides. Therefore, the thermal stability of the overall lower layer can be improved by incorporating alumina. It is preferable for the alumina and the $CeO_2$—$ZrO_2$ complex oxide to be mixed at a blending ratio by mass ($CeO_2$—$ZrO_2$ complex oxide/alumina) of between 1/3 and 4/1 (preferably between 1/2 and 3/1, and more preferably between 1/1 and 3/1 (for example, 2/1)). According to this constitution, because the ratio of the alumina and the $CeO_2$—$ZrO_2$ complex oxide achieves an appropriate balance, the effects mentioned above can be better exhibited while durability can be increased by means of the alumina.

The average thickness of the lower layer (first layer) 34 is not particularly limited, but is generally 10 μm to 50 μm. If the average thickness of the lower layer 34 is significantly less than 10 μm or significantly greater than 50 μm, the NOx elimination performance improvement effect achieved by providing the noble metal-free layer that contains the noble metal-free OSC material is not sufficiently exhibited, and high purifying performance may not be achieved. The thickness of the lower layer 34 is suitably approximately 10 μm to 50 μm, preferably 20 μm to 40 μm, and more preferably 25 μm to 35 μm (for example, 30±2 μm). The formed quantity (coated quantity) of the lower layer 34 is not particularly limited, but is preferably, for example, approximately 40 g to 200 g per 1 L of volume of the honeycomb substrate 10. If the formed quantity of the lower layer 34 is too low, the catalytic performance improvement effect achieved by using the noble metal-free layer that contains the OSC material is not sufficiently exhibited, but if the formed quantity of the lower layer 34 is too high, there are concerns regarding an increase in pressure loss when an exhaust gas passes through cells in the honeycomb substrate 10.

<Upper Layer (Second Layer)>

The upper layer (second layer) 32 that constitutes the catalyst coat layer 30 disclosed here includes a carrier and a noble metal supported on the carrier. In this embodiment, the upper layer 32 includes at least rhodium (Rh) and platinum (Pt) as noble metals. Rh mainly eliminates NOx present in exhaust gases. In addition, Pt mainly eliminates HC and CO present in exhaust gases.

<Upper Layer Carrier>

The carrier that supports a noble metal in the upper layer 32 can contain substances used as this type of carrier in the past, such as alumina ($Al_2O_3$), zirconia ($ZrO_2$), and solid solutions and complex oxides thereof. For example, a carrier containing $Al_2O_3$ is preferred.

This $Al_2O_3$ carrier may contain other compounds (typically inorganic oxides) as secondary components. Rare earth elements such as lanthanum, alkaline earth elements such as calcium, and transition metals can be used as such compounds. Of these, rare earth elements such as lanthanum can be advantageously used as stabilizers in order to improve the specific surface area of the complex oxide at high temperatures without impairing the function of the catalyst. For example, rare earth oxides such as $La_2O_3$ and $Nd_2O_3$ can be incorporated in order to suppress sintering or the like. These rare earth oxides may be physically mixed as individual oxides in a carrier powder, and can be a single component of the complex oxide. The content (mass ratio) of these secondary components is preferably 2% to 30% (for example, 5% to 15%) of the overall carrier. If the content of secondary components is significantly lower than 2 mass %, effects such as suppressing sintering are insufficient, and if the content of secondary components is significantly higher than 30 mass %, the quantity of $Al_2O_3$ in the carrier shows a relative decrease, which can cause a deterioration in catalytic activity.

The carrier that supports the noble metal in the upper layer 32 disclosed here may be a carrier material other than $Al_2O_3$. An example of this type of carrier material is an OSC material having oxygen storage capacity. In other words, the upper layer 32, unlike the lower layer 34, may contain an OSC material on which a noble metal is supported. For example, the use of an OSC material made of a $CeO_2$—$ZrO_2$ complex oxide is preferred. In cases where both the upper layer 32 and the lower layer 34 contain a $CeO_2$—$ZrO_2$ complex oxide, it is preferable for the quantity of $CeO_2$ in the $CeO_2$—$ZrO_2$ complex oxide contained in the upper layer 32 to be approximately $1/10$ or less (and more preferably $1/15$ or less) of the quantity of $CeO_2$ in the $CeO_2$—$ZrO_2$ complex oxide contained in the lower layer 34. In cases where the proportions of $CeO_2$—$ZrO_2$ complex oxide in the upper layer 32 and lower layer 34 are as mentioned above, it is possible to achieve satisfactory catalytic activity in the upper layer 32 without impairing the catalyst performance improvement effect achieved by disposing the noble metal-free OSC material in the lower layer 34.

<Noble Metal in Second Layer (Upper Layer)>

Rh, which is a noble metal contained in the upper layer 32, is supported on the carrier that contains $Al_2O_3$ and/or a $CeO_2$—$ZrO_2$ complex oxide. The supported quantity of Rh is not particularly limited, but is suitably within the range 0.01 to 2 mass % (for example, 0.05 to 1 mass %) relative to the overall mass of the carrier that supports the Rh in the upper layer. If this supported quantity is lower than the range mentioned above, sufficient catalytic activity cannot be achieved, and even if this supported quantity is higher than the range mentioned above, the effect achieved reaches a saturation point, which is not economically advantageous. The method for supporting the Rh on the carrier in the upper layer 32 is not particularly limited. For example, it is possible to impregnate a powdered carrier made of $Al_2O_3$ with an aqueous solution containing a rhodium salt (for example, a nitrate salt) or a rhodium complex (for example, a tetraammine complex), drying and then firing.

As mentioned above, the upper layer 32 of the catalyst coat layer 30 contains Pt in addition to Rh. The carrier that supports Pt into the upper layer 32 can be the same as the carrier that supports Rh in the upper layer 32, and is a carrier that contains, for example, $Al_2O_3$ and/or a $CeO_2$—$ZrO_2$ complex oxide. However, it is preferable for the carrier that supports Rh and the carrier that supports Pt to be separate bodies. By supporting Rh and Pt on separate carriers, it is possible to prevent alloying of the Rh and Pt.

The mass ratio of Rh and Pt (Rh/Pt) contained in the upper layer 32 is generally between 5/1 and 1/5, preferably between 4/1 and 1/1, more preferably between 3/1 and 1/1, and further preferably between 3/1 and 3/2. According to this constitution, because the ratio of Rh and Pt in the upper layer 32 achieves an appropriate balance, NOx and HC elimination performance can be reliably exhibited. The upper layer 32 disclosed here may contain other noble metal catalysts as long as the performance of the Rh and Pt is not impaired. Examples of noble metal catalysts other than Rh and Pt include palladium (Pd), ruthenium (Ru), iridium (Ir) and osmium (Os).

The formed quantity (coated quantity) of the upper layer 32 is not particularly limited, but is preferably, for example, approximately 20 g to 200 g per 1 L of volume of the honeycomb substrate 10. If the formed quantity of the upper layer 32 is too low, the catalytic effect achieved by using the noble metal may be insufficient, but if the formed quantity of the upper layer 32 is too high, there are concerns regarding an increase in pressure loss when an exhaust gas passes through cells in the honeycomb substrate 10.

<Method for Forming Catalyst Coat Layer>

When forming the lower layer 34 of the catalyst coat layer 30, a slurry that contains the noble metal-free OSC material (typically a powder) and other lower layer-constituting components (for example, alumina) should be wash coated on the surface of the substrate (for example, a honeycomb substrate) 10. When forming the upper layer 32 of the catalyst coat layer 30, a slurry should be prepared by mixing a powdered carrier on which Rh has been supported in advance and a powdered carrier on which Pt has been supported in advance, and this slurry should then be wash coated on the surface of the lower layer 34. In a process where the catalyst coat layer 30 is formed by wash coating, the slurry may contain a binder in order to suitably adhere the slurry to the surface of the substrate 10 or the surface of the lower layer 34. For example, it is preferable to use an alumina sol, a silica sol, or the like, as a binder. The viscosity of the slurry should be adjusted as appropriate so that the slurry can flow easily into the cells of the substrate (for example, a honeycomb substrate). The conditions for drying the slurry wash coated on the surface of the substrate 10 depend on the shape and dimensions of the substrate or carrier, but are typically approximately 1 to 10 hours at a temperature of approximately 80 to 300° C. (for example, 100 to 250° C.), and the firing conditions are approximately 1 to 4 hours at a temperature of approximately 400 to 1000° C. (for example, 500 to 700° C.).

An explanation has been given above of an exhaust gas purifying catalyst 100 according to one embodiment of the present invention, but the present invention is not limited to this embodiment.

For example, in the embodiment described above, the laminate structure of the catalyst coat layer 30 is such that a noble metal-free layer that contains a noble metal-free OSC material such as that described above is present as the first layer (lower layer) 34 that is nearer to the surface of the substrate 10 and a noble metal-containing layer such as that described above is present as the second layer (upper layer) 32 that is further from the surface of the substrate 10, but the laminate structure of the catalyst coat layer 30 may have three or more layers containing, in addition to the two layers mentioned above, other layers (for example, other layers formed between the first layer 34 and the second layer 32). In such cases, it is preferable for the noble metal-free layer that contains a noble metal-free OSC material to be the lowermost layer, which is in contact with the surface of the substrate 10. In addition, the noble metal-containing layer (upper layer) 32 may be divided into two layers. For example, it is possible to provide a noble metal-free layer that contains a noble metal-free OSC material in the lowermost layer, which is in contact with the surface of the substrate 10, provide an intermediate layer, which contains Pt as a noble metal, on the lowermost layer, and provide an uppermost layer, which contains Rh as a noble metal, on the intermediate layer. Furthermore, the catalyst coat layer 30 is such that the upper layer 32 and lower layer 34 do not need to form a two layer upper and lower structure across the entire substrate (for example, a honeycomb substrate) 10, and it is possible for a part of the upper layer 32 and a part of the lower layer 34 to be partially overlaid.

In addition, in the embodiment described above, the noble metal-free layer containing a noble metal-free OSC material is used as the first layer (lower layer) 34 that is nearer to the surface of the substrate 10 and the noble metal-containing layer is used as the second layer (upper layer) 32 that is further from the surface of the substrate 10, but the present invention is not limited thereto. For example, it is possible to use a catalyst coat layer in which a noble metal-containing layer is the first layer (lower layer) that is nearer to the surface of the substrate 10 and a noble metal-free layer that contains a noble metal-free OSC material is the upper layer (second layer) that is further from the surface of the substrate 10. That is, it is possible for the lower layer 34 and upper layer 32 of the catalyst coat layer 30 shown in FIG. 2 to be reversed. Because the noble metal-free OSC material is separated from noble metals in this constitution also, high NOx elimination performance can be achieved. However, the use of a noble metal-free layer that contains a noble metal-free OSC material as the lower layer and the use of a noble metal-containing layer as the upper layer, as described in the embodiment above, is preferred from the perspective of achieving higher NOx elimination performance.

Experimental Example 1

Explanations will now be given of experimental examples relating to the present invention, but it is not intended that the present invention is limited to these experimental examples.

<Sample 1: Arrangement of Noble Metal-Free OSC Material as Lower Layer (2 Layers)>

In the present example, a catalyst coat layer was produced by arranging a noble metal-supporting alumina as the upper layer and arranging a noble metal-free OSC material as the lower layer. Specifically, a slurry A was obtained by mixing 100 g of a $CeO_2$—$ZrO_2$ complex oxide (hereinafter referred to as a CZ oxide) having a fluorite type structure as a noble metal-free OSC material, 50 g of alumina and water, and milling the obtained mixture. A lower layer 34 formed of a noble metal-free layer that did not contain a noble metal was formed on the surface of a honeycomb substrate by wash coating the substrate with this slurry A, drying for 1 hour at a temperature of 250° C. and then firing for 1 hour at a temperature of 500° C. The thickness of the lower layer was 30 μm. In addition, a slurry B (having a Rh/Pt ratio of 2/1) was obtained by mixing 50 g of powdered alumina having 0.2 g of Rh supported thereon, 50 g of powdered alumina having 0.1 g of Pt supported thereon, and water, and milling the obtained mixture. A noble metal-containing upper layer 32 was formed on the surface of a honeycomb substrate by wash coating the substrate, on which the lower layer 34 had been formed, with this slurry B, drying for 1 hour at a temperature of 250° C. and then firing for 1 hour at a temperature of 500° C. An exhaust gas purifying catalyst according to Sample 1 was obtained in this way.

<Sample 2: Use of Both Noble Metal-Free OSC Material and Noble Metal-Supported OSC Material (2 Layers)>

In the present example, a catalyst coat layer was produced by replacing alumina with a CZ oxide as the carrier in the upper layer. Specifically, a slurry C was prepared by mixing 5 g of a CZ oxide having 0.2 g of Rh supported thereon, 5 g of a CZ oxide having 0.1 g of Pt supported thereon, and water, and the upper layer 32 was formed using this slurry C. Other than this, an exhaust gas purifying catalyst was produced using the same procedure as that used for Sample 1.

<Sample 3: Arrangement of Noble Metal-Free OSC Material as Upper Layer (2 Layers)>

In the present example, a catalyst coat layer was produced by reversing the upper layer and lower layer of the catalyst of Sample 1. Specifically, the lower layer 34 was formed on the surface of a honeycomb substrate by wash coating the substrate with slurry B, drying for 1 hour at a temperature of 250° C., and firing for 1 hour at a temperature of 500° C. Next, a noble metal-containing upper layer 32 was formed on the surface of the honeycomb substrate (the lower layer 34) by wash coating the substrate with this slurry A, drying for 1 hour at a temperature of 250° C. and then firing for 1 hour at a temperature of 500° C. Other than this, an exhaust gas purifying catalyst was produced using the same procedure as that used for Sample 1.

<Sample 4: Use of Noble Metal-Free OSC Material (Single Layer)>

In the present example, a single layer catalyst coat layer containing a noble metal-free OSC material and a noble metal-supporting alumina was produced. Specifically, a slurry D was obtained by mixing 50 g of powdered alumina having 0.2 g of Rh supported thereon, 50 g of powdered alumina having 0.1 g of Pt supported thereon, 100 g of a powdered CZ oxide as an OSC material, and water, and milling the obtained mixture. A catalyst coat layer was formed on the surface of a honeycomb substrate by wash coating the substrate with this slurry D, drying for 1 hour at a temperature of 250° C. and then firing for 1 hour at a temperature of 500° C.

<Sample 5: Use of Noble Metal-Supporting OSC Material (Single Layer)>

In the present example, a single layer catalyst coat layer containing a noble metal-supporting OSC material was produced. Specifically, a slurry E was obtained by mixing 50 g of a powdered CZ oxide having 0.2 g of Rh supported thereon, 50 g of a powdered CZ oxide having 0.1 g of Pt supported thereon, 100 g of powdered alumina, and water, and milling the obtained mixture. A catalyst coat layer was formed on the surface of a honeycomb substrate by wash coating the substrate with this slurry E, drying for 1 hour at a temperature of 250° C. and then firing for 1 hour at a temperature of 500° C.

Figure 3:
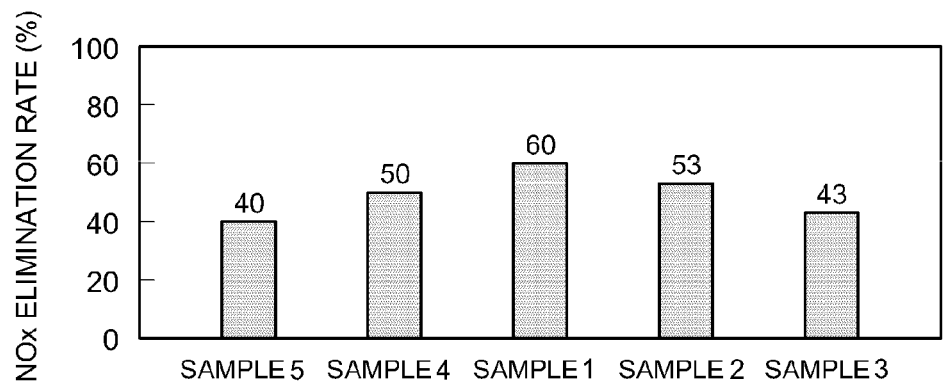
FIG. 3 is a graph in which NOx elimination rates are compared for a variety of samples.

The NOx elimination performance of the exhaust gas purifying catalysts of Samples 1 to 5 was evaluated. Specifically, an exhaust gas purifying catalyst was placed in a circulation tube, an exhaust gas was passed through the circulation tube, and the atmosphere was made to be lean, and then switched to be rich. After switching to a rich atmosphere, the NOx elimination rate was measured after a prescribed period of time had passed. Here, the NOx elimination rate (%) was calculated from "(NOx concentration (ppm) in gas introduced to catalyst–NOx concentration (ppm) in gas discharged from catalyst)/NOx concentration (ppm) in gas introduced to catalyst"×100. The results are shown in FIG. 3. FIG. 3 is a graph in which NOx elimination rates are compared for a variety of examples.

As shown in FIG. 3, the catalysts according to Samples 1 to 4, which used noble metal-free OSC materials, exhibited higher NOx elimination rates and better NOx elimination performance than Sample 5. From these results, it can be confirmed that using a noble metal-free OSC material can improve NOx elimination performance. In addition, the catalysts according to Samples 1 and 2, in which a noble metal-free OSC material was arranged in the lower layer and a noble metal was arranged in the upper layer, exhibited high NOx elimination rates and excellent NOx elimination performance. However, the catalyst of Sample 4, in which a noble metal-free OSC material and a noble metal were arranged in a single layer, could not achieve a satisfactory NOx elimination performance improvement effect compared to Samples 1 and 2. In view of these results, it is preferable for a noble metal-free OSC material and a noble metal to be arranged separately in upper and lower layers. In addition, it is preferable for a noble metal-free OSC material to be arranged in the lower layer and a noble metal to be arranged in the upper layer.

Experimental Example 2

In Samples 6 to 9, exhaust gas purifying catalysts were produced by varying the thickness of the noble metal-free layer (lower layer) that contained a noble metal-free OSC material in the catalyst coat layer of Sample 1 between 10 µm and 50 m.

In Sample 6, 60 g of a CZ oxide and 30 g of alumina were mixed in slurry A, and the thickness of the lower layer was 10 µm. In Sample 7, 80 g of a CZ oxide and 40 g of alumina were mixed in slurry A, and the thickness of the lower layer was 20 µm. In Sample 8, 120 g of a CZ oxide and 60 g of alumina were mixed in slurry A, and the thickness of the lower layer was 40 µm. In Sample 9, 140 g of a CZ oxide and 70 g of alumina were mixed in slurry A, and the thickness of the lower layer was 50 µm. Other than this, exhaust gas purifying catalysts were obtained using the same procedure as that used for Sample 1. The NOx elimination rates of the exhaust gas purifying catalysts obtained in the samples were evaluated. The results are shown in FIG. 4.

Figure 4:
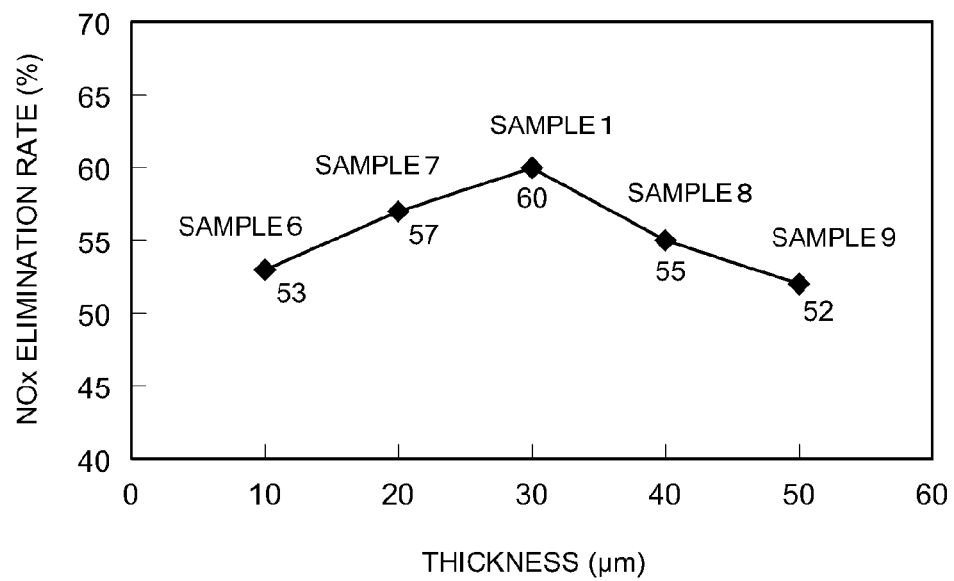
FIG. 4 is a graph that shows the relationship between the thickness of a lower layer and the NOx elimination rate.

As shown in FIG. 4, the NOx elimination rate tends to deteriorate in cases where the thickness of the lower layer that contains a noble metal-free OSC material is too low or too high. In the case of the exhaust gas purifying catalyst samples tested here, the thickness of the lower layer that contains a noble metal-free OSC material should be 10 µm to 50 µm, preferably 20 µm to 40 µm, and more preferably approximately 30 µm in order to achieve high NOx elimination performance.

Experimental Example 3

In Samples 10 to 14, exhaust gas purifying catalysts were produced by varying the blending ratio of the noble metal-free OSC material (CZ oxide) and the alumina (CZ oxide/ alumina ratio) contained in the noble metal-free layer (lower layer) in the catalyst coat layer of Sample 1 within the range 1/3 to 4/1.

In Sample 10, 38 g of a CZ oxide and 112 g of alumina were mixed in slurry A, and the blending ratio (CZ oxide/ alumina) was 1/3. In Sample 11, 50 g of a CZ oxide and 100 g of alumina were mixed in slurry A, and the blending ratio (CZ oxide/alumina) was 1/2. In Sample 12, 75 g of a CZ oxide and 75 g of alumina were mixed in slurry A, and the blending ratio (CZ oxide/alumina) was 1/1. In Sample 13, 112 g of a CZ oxide and 38 g of alumina were mixed in slurry A, and the blending ratio (CZ oxide/alumina) was 3/1. In Sample 14, 120 g of a CZ oxide and 30 g of alumina were mixed in slurry A, and the blending ratio (CZ oxide/alumina) was 4/1. Other than this, exhaust gas purifying catalysts were obtained using the same procedure as that used for Sample 1. The NOx elimination rates of the exhaust gas purifying catalysts obtained in the samples were evaluated. The results are shown in FIG. 5.

Figure 5:
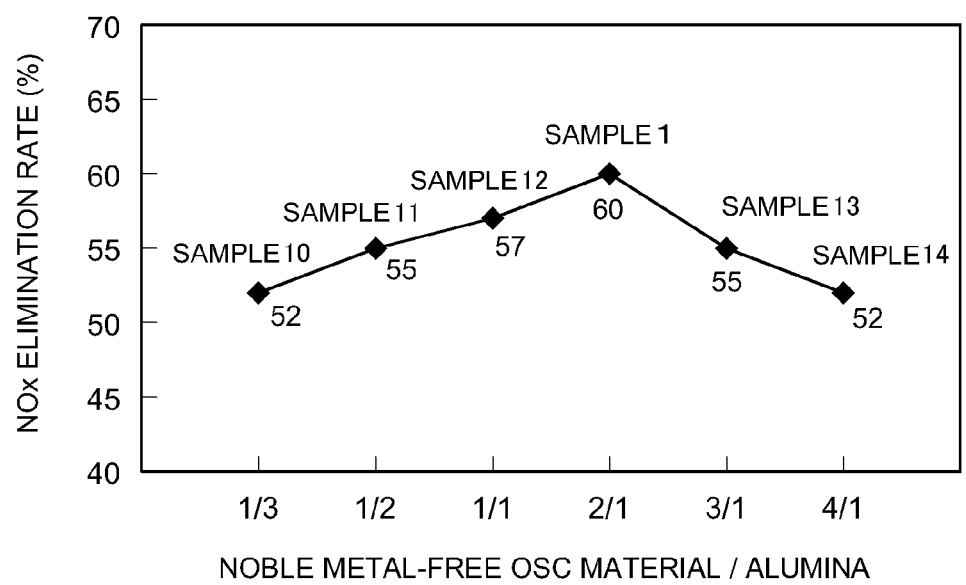
FIG. 5 is a graph that shows the relationship between the blending ratio (noble metal-free OSC material/alumina) and the NOx elimination rate.

As shown in FIG. 5, the NOx elimination rate tends to deteriorate in cases where the mixing ratio of the noble metal-free OSC material (CZ oxide) and the alumina is too high or too low. In the case of the exhaust gas purifying catalyst samples tested here, this blending ratio (CZ oxide/ alumina) should be between 1/3 and 4/1, preferably between 1/2 and 3/1, and more preferably approximately 2/1 in order to achieve high NOx elimination performance.

Experimental Example 4

The mass ratio of Rh and Pt (Rh/Pt) contained in the noble metal-containing layer (upper layer) was tested in the following way in order to confirm the effect on purifying performance.

In Samples 15 to 19, exhaust gas purifying catalysts were produced by varying the mass ratio of Rh and Pt (Rh/Pt) contained in the noble metal-containing layer (upper layer) in the catalyst coat layer of Sample 1 within the range 1/2 to 5/1. Specifically, the quantity of Rh used was 0.05 g in Sample 15 (Rh/Pt=1/2), 0.1 g in Sample 16 (Rh/Pt=1/1), 0.3 g in Sample 17 (Rh/Pt=3/1), 0.4 g in Sample 18 (Rh/Pt=4/1), and 0.5 g in Sample 19 (Rh/Pt=5/1). Other than this, exhaust gas purifying catalysts were obtained using the same procedure as that used for Sample 1. The NOx elimination rates of the exhaust gas purifying catalysts obtained in the samples were evaluated. The results are shown in FIG. 6.

Figure 6:
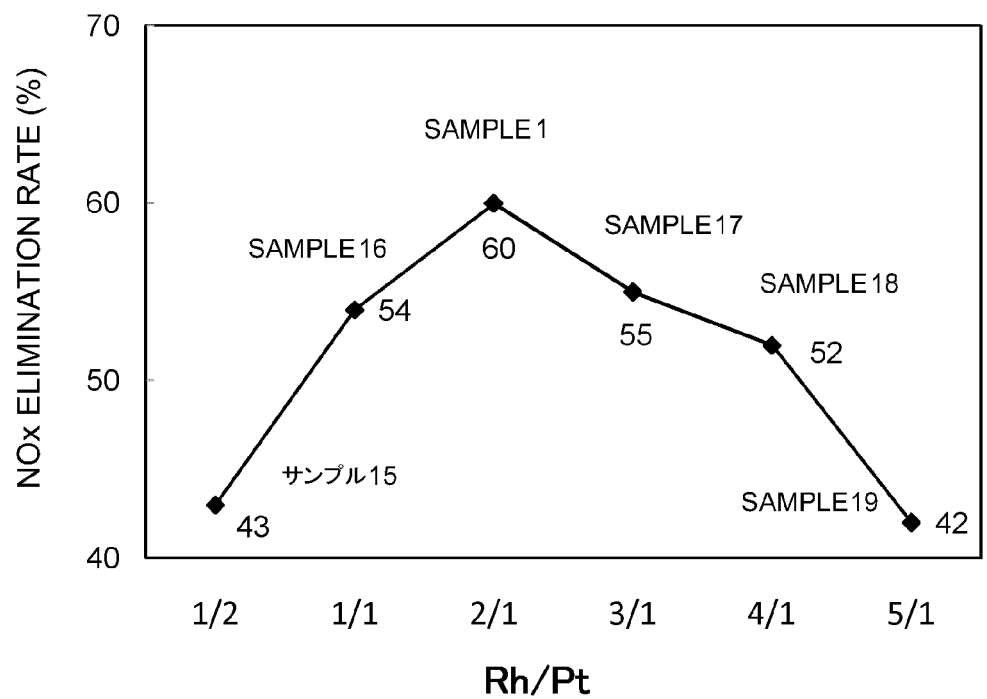
FIG. 6 is a graph in which NOx elimination rates are compared for a variety of samples.

As shown in FIG. 6, the NOx elimination rate tends to deteriorate in cases where the mass ratio of Rh and Pt (Rh/Pt) contained in the noble metal-containing layer (upper layer) is too high or too low in an exhaust gas purifying catalyst provided with an OSC material-containing noble metal-free layer. This Rh/Pt mass ratio should be between 1/2 and 4/1, preferably between 1/1 and 3/1, and more preferably approximately 2/1 in order to achieve high NOx elimination performance.

Experimental Example 5

The following experiment was carried out in order to confirm the effect on purifying performance of the type (crystalline structure) of CZ oxide contained in the noble metal-free layer (lower layer).

In Sample 20, an exhaust gas purifying catalyst was produced using the same procedure as that used for Sample 1, except that the CZ oxide having a fluorite type structure contained in the noble metal-free layer (lower layer) in the catalyst coat layer of Sample 1 was changed to a CZ oxide having a pyrochlore type structure and the thickness of the noble metal-free layer (lower layer) was changed to 27 µm.

In addition, in Samples 21 to 23, exhaust gas purifying catalysts were produced by varying the mass ratio of Rh and Pt (Rh/Pt) contained in the noble metal-containing layer (upper layer) in the catalyst coat layer of Sample 20 within the range 1/1 to 4/1. Specifically, the quantity of Rh used was 0.1 g in Sample 21 (Rh/Pt=1/1), 0.3 g in Sample 22 (Rh/Pt=3/1), and 0.4 g in Sample 23 (Rh/Pt=4/1). Other than this, exhaust gas purifying catalysts were obtained using the same procedure as that used for Sample 20. The NOx elimination rates of the exhaust gas purifying catalysts obtained in the samples were evaluated. The results are shown in FIG. 7.

Figure 7:
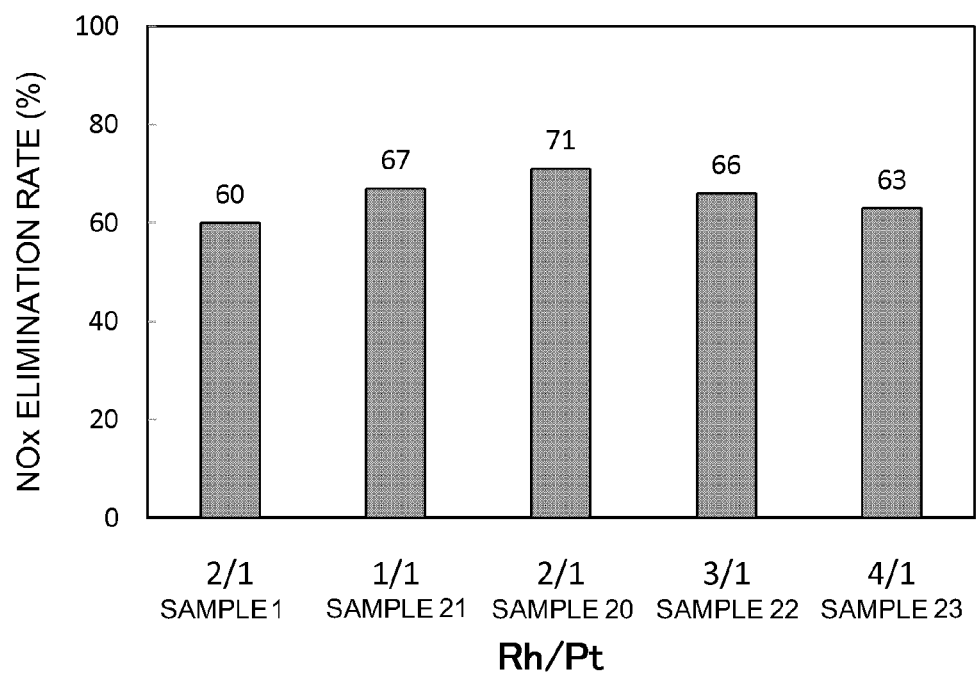
FIG. 7 is a graph in which NOx elimination rates are compared for a variety of samples.

As shown in FIG. 7, Sample 20, in which a CZ oxide having a pyrochlore type structure was used as an OSC material, exhibited significantly improved NOx elimination performance compared to Sample 1, in which a CZ oxide having a fluorite type structure was used. In view of this, the use of a CZ oxide having a pyrochlore type structure as an OSC material is preferred in an exhaust gas purifying catalyst provided with an OSC material-containing noble metal-free layer.

In the case of the exhaust gas purifying catalyst samples tested here, using a CZ oxide having a pyrochlore type structure as an OSC material and setting the Rh/Pt mass ratio in the noble metal-containing layer (upper layer) to be between 1/1 and 4/1 achieved an extremely high NOx elimination rate of 63% or higher. In view of these results, it is preferable to use a CZ oxide having a pyrochlore type structure as an OSC material and set the Rh/Pt mass ratio in the noble metal-containing layer (upper layer) to be between 1/1 and 4/1 (and preferably between 1/1 and 3/1) in an exhaust gas purifying catalyst provided with an OSC material-containing noble metal-free layer.

Specific examples of the present invention have been explained in detail above, but these are merely examples, and do not limit the scope of the invention. The features disclosed in the claims also encompass modes obtained by variously modifying or altering the specific examples shown above.

INDUSTRIAL APPLICABILITY

According to the present invention, it is possible to provide an exhaust gas purifying catalyst that can exhibit high NOx elimination performance.

The invention claimed is:

1. An exhaust gas purifying catalyst which is disposed in an exhaust passage of an internal combustion engine and eliminates NOx contained in exhaust gas, the exhaust gas purifying catalyst comprising: a substrate; and a catalyst coat layer formed on a surface of the substrate, wherein
the catalyst coat layer consists of a first layer formed on the surface of the substrate and a second layer formed on the surface of the first layer,
the second layer includes a carrier and a noble metal supported on the carrier, and
the first layer is a noble metal-free layer that does not contain a noble metal but does contain an OSC material having oxygen storage capacity,
wherein the second layer comprises Rh and Pt, and
the mass ratio of Rh and Pt (Rh/Pt) contained in the second layer is between 1/1 and 4/1.

2. The exhaust gas purifying catalyst according to claim 1, wherein an average thickness of the noble metal-free layer is 10 to 50 μm.

3. The exhaust gas purifying catalyst according to claim 1, wherein the noble metal-free layer includes a ceria-zirconia complex oxide as the OSC material.

4. The exhaust gas purifying catalyst according to claim 1, wherein the layer containing the noble metal includes alumina as the carrier.

5. The exhaust gas purifying catalyst according to claim 1, wherein the layer containing the noble metal includes an OSC material having oxygen storage capacity as the carrier.

6. The exhaust gas purifying catalyst according to claim 1, wherein the OSC material contained in the noble metal-free layer comprises an OSC material having a pyrochlore structure.

* * * * *